US012431075B2

(12) United States Patent
Ahn et al.

(10) Patent No.: US 12,431,075 B2
(45) Date of Patent: Sep. 30, 2025

(54) DISPLAY DEVICE

(71) Applicant: Samsung Display Co., Ltd., Yongin-Si (KR)

(72) Inventors: Kuk Hwan Ahn, Yongin-si (KR); Seung Jae Lee, Yongin-si (KR); Dae Gwang Jang, Yongin-si (KR); Seong Heon Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/795,188

(22) Filed: Aug. 6, 2024

(65) Prior Publication Data

US 2025/0201173 A1 Jun. 19, 2025

(30) Foreign Application Priority Data

Dec. 13, 2023 (KR) ........................ 10-2023-0181048

(51) Int. Cl.
*G09G 3/32* (2016.01)

(52) U.S. Cl.
CPC ....... *G09G 3/32* (2013.01); *G09G 2300/0842* (2013.01); *G09G 2310/027* (2013.01); *G09G 2320/041* (2013.01); *G09G 2330/028* (2013.01)

(58) Field of Classification Search
None
See application file for complete search history.

(56) References Cited

U.S. PATENT DOCUMENTS

2016/0351097 A1* 12/2016 Sato ........................ G09G 3/344
2024/0169895 A1* 5/2024 Ahn ........................ G06F 3/0679

FOREIGN PATENT DOCUMENTS

KR 10-2024-0074095 A 5/2024

* cited by examiner

*Primary Examiner* — Ifedayo B Iluyomade
(74) *Attorney, Agent, or Firm* — Innovation Counsel LLP

(57) ABSTRACT

A display device includes: a display panel including pixels; a first driver supplying data voltages to A pixels using first image data; a second driver supplying data voltages to B pixels smaller than the A pixels using second image data; a third driver disposed adjacent to the second driver in a first direction, the third driver supplying data voltages corresponding pixels using third image data; a first controller calculating a first load ratio of the first driver using the first image data, and a second load ratio of the second driver using the second image data; and a second controller calculating a third load ratio of the third driver using the third image data. The first controller receives the third load ratio from the second controller, and generates a first temperature profile for the first driver and the second driver using the first, the second, and the third load ratios.

20 Claims, 20 Drawing Sheets

| SIC Number | Load(%) |
|---|---|
| SIC6 | 50 |
| SIC7 | 50 |
| SIC8 | 50 |
| SIC9 | 50 |

| SIC Number | Load(%) |
|---|---|
| SIC6 | 25 |
| SIC7 | 75 |
| SIC8 | 75 |
| SIC9 | 25 |

| SIC Number | Load(%) |
|---|---|
| SIC6 | 50 |
| SIC7 | 50 |
| SIC8 | 50 |
| SIC9 | 50 |

| SIC Number | Load(%) |
| --- | --- |
| SIC6 | 25 |
| SIC7 | 75 |
| SIC8 | 75 |
| SIC9 | 25 |

DISPLAY DEVICE

CROSS-REFERENCE TO RELATED APPLICATION

The present application claims priority under 35 U.S.C. § 119 (a) to Korean patent application No. 10-2023-0181048 filed on Dec. 13, 2023, in the Korean Intellectual Property Office, the entire disclosure of which is incorporated herein by reference.

BACKGROUND

1. Technical Field

The present disclosure generally relates to a display device.

2. Related Art

With the development of information technologies, the importance of a display device which is a connection medium between a user and information increases. Accordingly, display devices such as a liquid crystal display device and an organic light emitting display device are increasingly used.

In addition, various automotive display devices substituting for dashboards, side mirrors, and the like of vehicles have been developed. In order to suit in-vehicle positions, these display devices are required to be manufactured using display panels having various shapes instead of rectangular shapes.

SUMMARY

Embodiments provide a display device capable of generating a temperature profile with respect to display panels having various shapes.

In accordance with an aspect of the present disclosure, there is provided a display device including: a display panel including pixels; a first driver configured to supply data voltages to A pixels based on received first image data, where A is an integer greater than 1; a second driver configured to supply data voltages to B pixels based on received second image data, where B is an integer greater than 0 and smaller than the A; a third driver disposed adjacent to the second driver in a first direction, the third driver supplying data voltages corresponding pixels based on received third image data; a first controller configured to calculate a first load ratio of the first driver based on the first image data, and calculate a second load ratio of the second driver based on the second image data; and a second controller configured to calculate a third load ratio of the third driver based on the third image data, wherein the first controller receives the third load ratio from the second controller, and generates a first temperature profile for the first driver and the second driver using the first load ratio, the second load ratio, and the third load ratio.

The display panel may further include a notch portion. The pixels connected to the second driver may be located in a second direction different from the first direction from the notch.

Data lines connected to the second driver may extend in the second direction.

The pixels connected to the first driver may be connected to P scan lines, where P is an integer greater than 1. The pixels connected to the second driver are connected to scan lines of which number may be smaller than the P.

A y-th scan line connected to pixels connected to the first driver may be a first scan line connected to pixels connected to the second driver, y is an integer greater than 1.

The first controller may include a grayscale voltage converter configured to convert first grayscale values included in the first image data into first voltage values, and convert second grayscale values included in the second image data into second voltage values.

The first controller may further include a load calculator configured to calculate the first load ratio using the first voltage values, and calculate the second load ratio using the second voltage values.

The display device may further include a memory storing first maximum temperature information of a first pixel row and first minimum temperature information of the first pixel row. The first controller may further include a one-dimensional profile generator configured to generate first predicted temperature information of the first pixel row using the first maximum temperature information, the first minimum temperature information, the first load ratio, the second load ratio, and the third load ratio.

The memory may further stores second maximum temperature information of a second pixel row and second minimum temperature information of the second pixel row. The one-dimensional profile generator may generate second predicted temperature information of the second pixel row using the second maximum temperature information, the second minimum temperature information, the first load ratio, the second load ratio, and the third load ratio.

The memory may further include first pixel column temperature information of a first pixel column. The first controller may further include a two-dimensional profile generator configured to generate a temperature profile by linearly interpolating the first predicted temperature information and the second predicted temperature information using the first pixel column temperature information.

The memory may further include first pixel column temperature information of a first pixel column and second pixel column temperature information of a second pixel column. The first pixel column may extend in a second direction different from the first direction from the second driver. The second pixel column may extend in the second direction between the second driver and the third driver.

The first controller may further include a two-dimensional profile generator configured to generate a first temperature profile by linearly interpolating the first predicted temperature information and the second predicted temperature information using the first pixel column temperature information and the second pixel column temperature information.

The first controller may further include an offset applier configured to generate a second temperature profile by adding a first offset to a time coordinate of temperature information corresponding to the first pixel column among temperature information included in the first temperature profile.

The offset applier may generate the second temperature profile by adding a second offset to a time coordinate of temperature information corresponding to the second pixel column. The second offset may be smaller than the first offset.

A first scan line may be connected to pixels connected to the first driver and pixels connected to the second driver.

The first controller may include a grayscale voltage converter configured to convert first grayscale values included in the first image data into first voltage values, and convert second grayscale values included in the second image data into second voltage values.

The first controller may further include a load calculator configured to calculate the first load ratio using the first voltage values, and calculate the second load ratio using the second voltage values.

The display device may further include a memory storing first maximum temperature information of a first pixel row, first minimum temperature information of the first pixel row, second maximum temperature information of a second pixel row, and second minimum temperature information of the second pixel row. The first controller may further include a one-dimensional profile generator configured to generate first predicted temperature information of the first pixel row using the first maximum temperature information, the first minimum temperature information, the first load ratio, the second load ratio, and the third load ratio, and generate second predicted temperature information of the second pixel row using the second maximum temperature information, the second minimum temperature information, the first load ratio, the second load ratio, and the third load ratio.

The memory may further store first pixel column temperature information of a first pixel column and second pixel column temperature information of a second pixel column. The first pixel column may extend in a second direction different from the first direction from the second driver. The second pixel column may extend in the second direction between the second driver and the third driver.

The first controller may further include a two-dimensional profile generator configured to generate a first temperature profile by linearly interpolating the first predicted temperature information and the second predicted temperature information using the first pixel column temperature information and the second pixel column temperature information.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
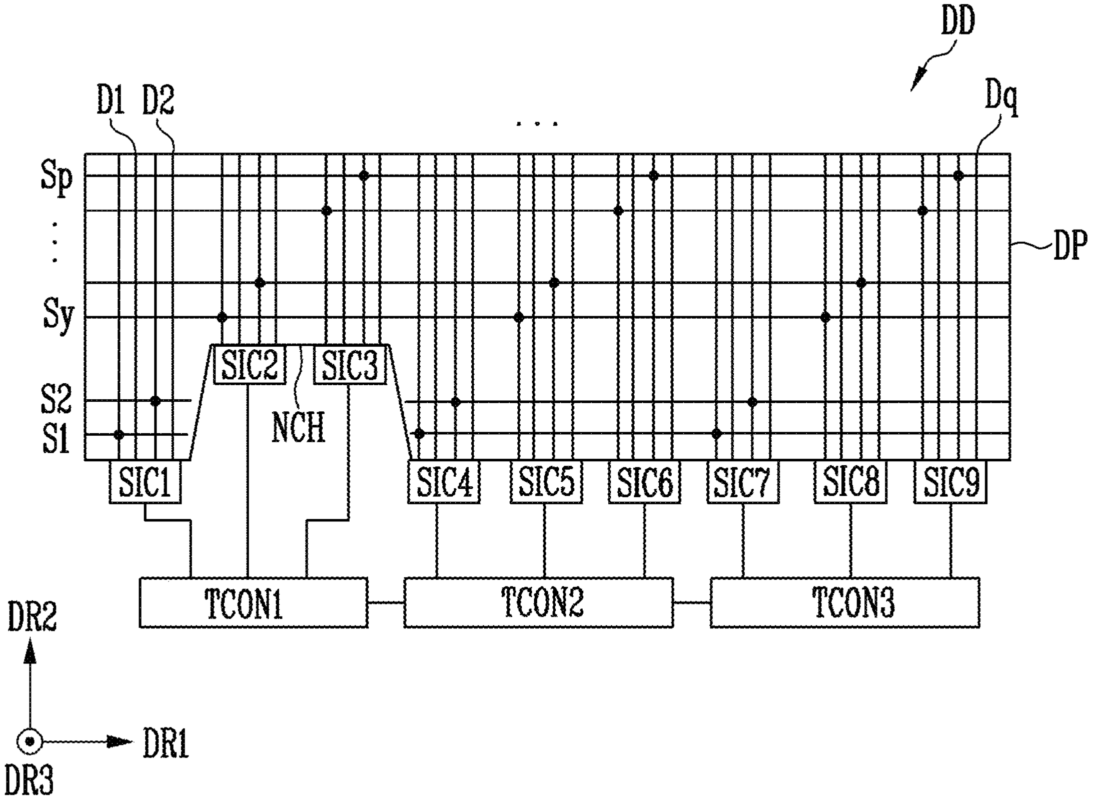
FIG. 1 is a diagram illustrating a display device in accordance with an embodiment of the present disclosure.

Hereinafter, exemplary embodiments are described in detail with reference to the accompanying drawings so that those skilled in the art may easily practice the present disclosure. The present disclosure may be implemented in various different forms and is not limited to the exemplary embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

In description, the expression "equal" may mean "substantially equal." That is, this may mean equality to a degree to which those skilled in the art can understand the equality. Other expressions may be expressions in which "substantially' is omitted.

FIG. 1 is a diagram illustrating a display device in accordance with an embodiment of the present disclosure.

Referring to FIG. 1, the display device DD in accordance with the embodiment of the present disclosure may include a display panel DP, a plurality of drivers SIC1, SIC2, SIC3, SIC4, SIC5, SIC6, SIC7, SIC8, and SIC9, and a plurality of controllers TCON1, TCON2, and TCON3. The display panel DP may have a plane extending in a first direction DR1 and a second direction DR2. A display direction of the display panel DP may be a third direction DR3. The first direction DR1, the second direction DR2, and the third direction DR3 may be perpendicular to one another.

The display panel DP may include a plurality of pixels. Each of the pixels may be connected to a corresponding scan line and a corresponding data line. A pixel row may mean pixels connected to the same scan line. A pixel column may mean pixels connected to the same data line. The display panel DP may include a plurality of scan lines S1, S2, . . . , Sy, . . . , and Sp. The scan lines S1 to Sp may extend in the first direction DR1, and be arranged parallel to each other in the second direction DR2. Also, the display panel DP may include a plurality of data lines D1, D2, . . . , Dq. The data lines D1 to Dq may extend in the second direction DR2, and be arranged parallel to each other in the first direction DR1.

The display panel DP may include a notch portion NCH. For example, the notch portion NCH is a portion at which a steering wheel of a vehicle is located, and may be a portion at which the pixels cannot be disposed. A display area of the display panel DP, which is located in the second direction DR2 from the notch portion NCH, may include a small number of scan lines as compared with other display areas. For example, a display area located in the second direction DR2 from drivers SIC1 and SIC4 to SIC9 may include p (p is an integer greater than 2) scan lines S1 to Sp. On the other hand, a display area located in the second direction DR2 from drivers SIC2 and SIC3 may include (p−y+1) (y is an integer greater than 1 and smaller than p) scan lines Sy to Sp. The number of scan lines included in each display area may be variously determined according to various shapes of the display panel DP.

The drivers SIC1 to SIC9 may supply data voltages based on received image data through the data lines D1, D2, . . . , and Dq to the pixels. The drivers SIC1 to SIC9 may be connected to different data lines. Therefore, the drivers SIC1 to SIC9 may be connected to different pixels.

The drivers SIC1 and SIC4 to SIC9 may be electrically connected to side portions of the display panel DP other than a side portion in which the notch portion NCH is disposed. The drivers SIC1 and SIC4 to SIC9 may supply data voltages to A number of pixels (where, A is an integer greater than 1) based on received image data. Since pixels connected to the respective drivers SIC1 and SIC4 to SIC9 are different from one another, image data received by the drivers SIC1 and SIC4 to SIC9 may be different from one another.

Meanwhile, the drivers SIC2 and SIC3 may be electrically connected to the side portion in which the notch portion NCH is disposed. The drivers SIC2 and SIC3 may supply data voltages to B number of pixels (where, B is an integer greater than 0 and smaller than A) based on received image data. Since pixels connected to the respective drivers SIC2 and SIC3 are different from each other, image data received by the drivers SIC2 and SIC3 may be different from each other.

The pixels connected to the drivers SIC1 and SIC4 to SIC9 may be connected to the p scan lines S1 to Sp. On the other hand, the pixels connected to the drivers SIC2 and SIC3 may be connected to scan lines smaller than p scan lines S1 to Sp, for example, (p-y+1) scan lines. For example, A yth scan line Sy to a pth scan line may be connected to the pixels connected to the drivers SIC1 to SIC9.

The drivers SIC1 to SIC9 may sequentially supply scan signals having a turn-on level to the scan lines S1 to Sp. In another embodiment, when the display device DD includes a scan driver, the drivers SIC1 to SIC9 may not connected to the scan lines. In this case, the scan driver may sequentially supply the scan signals having the turn-on level to the scan lines S1 to Sp.

A controller TCON1 may calculate a load ratio, which will be described later, of the driver SIC1 based on image data corresponding to the driver SIC1 and calculate a load ratio of the driver SIC2 based on image data corresponding to the driver SIC2, and calculate a load ratio of the driver SIC3 based on image data corresponding to the driver SIC3.

Similarly, a controller TCON2 may calculate a load ratio of the driver SIC4 based on image data corresponding to the driver SIC4, calculate a load ratio of the driver SIC5 based on image data corresponding to the driver SIC5, and calculate a load ratio of the driver SIC6 based on image data corresponding to the driver SIC6.

Similarly, a controller TCON3 may calculate a load ratio of the driver SIC7 based on image data corresponding to the driver SIC7, calculate a load ratio of the driver SIC8 based on image data corresponding to the driver SIC8, and calculate a load ratio of the driver SIC9 based on image data corresponding to the driver SIC9.

Meanwhile, the controller TCON1 may receive a load ratio of a driver disposed adjacent to the driver connected to the controller TCON1, for example, the driver SIC4, from the controller TCON2. The controller TCON1 may generate a temperature profile, which will be described later, for the drivers SIC1, SIC2, and SIC3 using the load ratios of the drivers SIC1, SIC2, SIC3, and SIC4. The driver SIC4 is a driver which is not connected to the controller TCON1, but is disposed most adjacent to the driver SIC3 connected to the controller TCON1 in the first direction DR1. Therefore, heat (e.g. a temperature increment) generated by the driver SIC4 may affect a temperature profile to be generated by the controller TCON1. In accordance with this embodiment, the controller TCON1 does not receive total image data of the driver SIC4 but receives the load ratio of the driver SIC4, so that an appropriate temperature profile can be generated through only a small amount of data exchange.

Similarly, the controller TCON2 may receive a load ratio of the driver SIC3 from the controller TCON1, and receive the load ratio of the driver SIC7 from the controller TCON3. The controller TCON2 may generate a temperature profile for the drivers SIC4, SIC5, and SIC6 using the load ratios of the drivers SIC3, SIC4, SIC5, SIC6, and SIC7.

Similarly, the controller TCON3 may receive the load ratio of the driver SIC6 from the controller TCON2. The controller TCON3 may generate a temperature profile for the drivers SIC7, SIC8, and SIC9 using the load ratios of the drivers SIC6, SIC7, SIC8, and SIC9.

The controllers TCON1, TCON2, and TCON3 may improve the display quality of the display device DD using the generated temperature profiles. For example, a threshold voltage of a driving transistor in a high temperature may be lower than a threshold voltage of a driving transistor in a low temperature. Therefore, different data voltages may be required to generate the same luminance according to locations of the pixels. The controllers TCON1, TCON2, and TCON3 may transmit image data obtained by decreasing or increasing grayscale values of the pixels to corresponding drivers SIC1 to SIC9 considering temperature profiles corresponding to image data.

Figure 2:
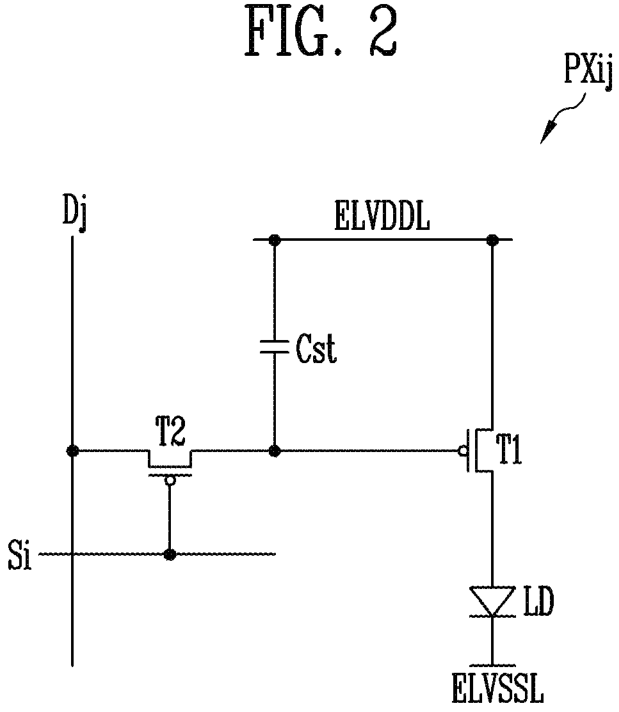
FIG. 2 is a diagram illustrating a pixel in accordance with an embodiment of the present disclosure.

FIG. 2 is a diagram illustrating a pixel in accordance with an embodiment of the present disclosure.

Referring to FIG. 2, an exemplary pixel PXij is illustrated. Other pixels may substantially have the same configuration, and therefore, overlapping descriptions will be omitted.

A gate electrode of a transistor T1 may be connected to a second electrode of a storage capacitor Cst, a first electrode of the transistor T1 may be connected to a first power line ELVDDL, and a second electrode of the transistor T1 may be connected to an anode of a light emitting diode LD. The transistor T1 may be referred to as a driving transistor.

A gate electrode of a transistor T2 may be connected to an ith scan line Si, a first electrode of the transistor T2 may be connected to a jth data line Dj, and a second electrode of the transistor T2 may be connected to the second electrode of the storage capacitor Cst. The transistor T2 may be referred to as a switching transistor.

A first electrode of the storage capacitor Cst may be connected to the first power line ELVDDL, and the second electrode of the storage capacitor Cst may be connected to the gate electrode of the transistor T1.

The anode of the light emitting diode LD may be connected to the second electrode of the transistor T1, and a cathode of the light emitting diode LD may be connected to a second power line ELVSSL. During an emission period of the light emitting diode LD, a first power voltage applied to the first power line ELVDDL may be higher than a second power voltage applied to the second power line ELVSSL.

Although it is illustrated that the transistors T1 and T2 are P-type transistors, those skilled in the art may replace at least one of the transistors T1 and T2 with an N-type transistor by inverting the polarity of a signal.

When a scan signal having a turn-on level is applied to the ith scan line Si, the transistor T2 may be turned on. A data voltage supplied from the jth data line Dj may be stored in the storage capacitor Cst. The transistor T1 may allow a driving current to flow through the light emitting diode LD corresponding to a gate-source voltage difference maintained by the storage capacitor Cst. The driving current may flow through a path of the first power line ELVDDL, the transistor T1, the light emitting diode LD, and the second power line ELVSSL. The light emitting diode LD may emit light with a luminance corresponding to an amount of driving current.

Figure 3:
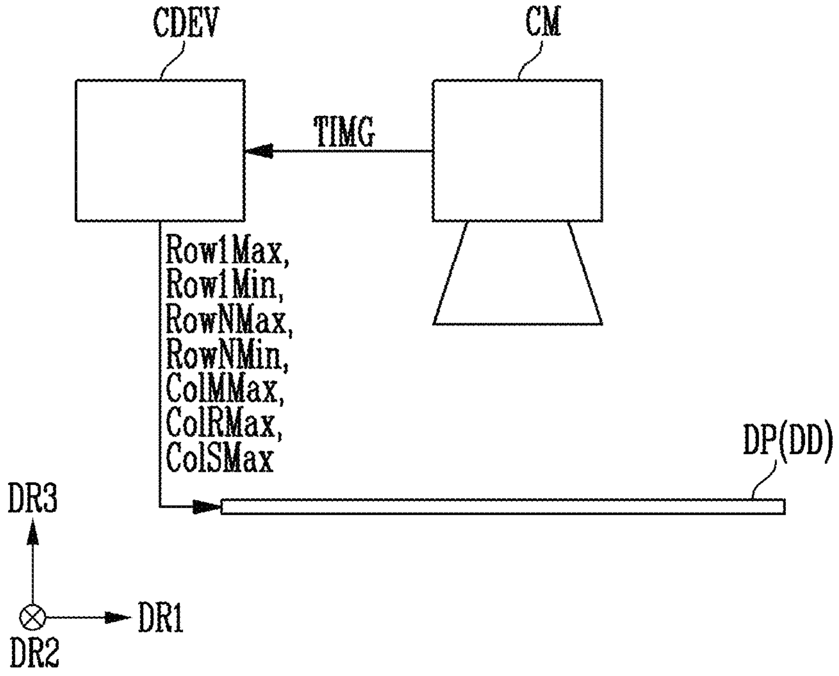
FIG. 3 is a diagram illustrating a relationship of a camera, a computing device, and the display device in accordance with an embodiment of the present disclosure.
Figure 4:
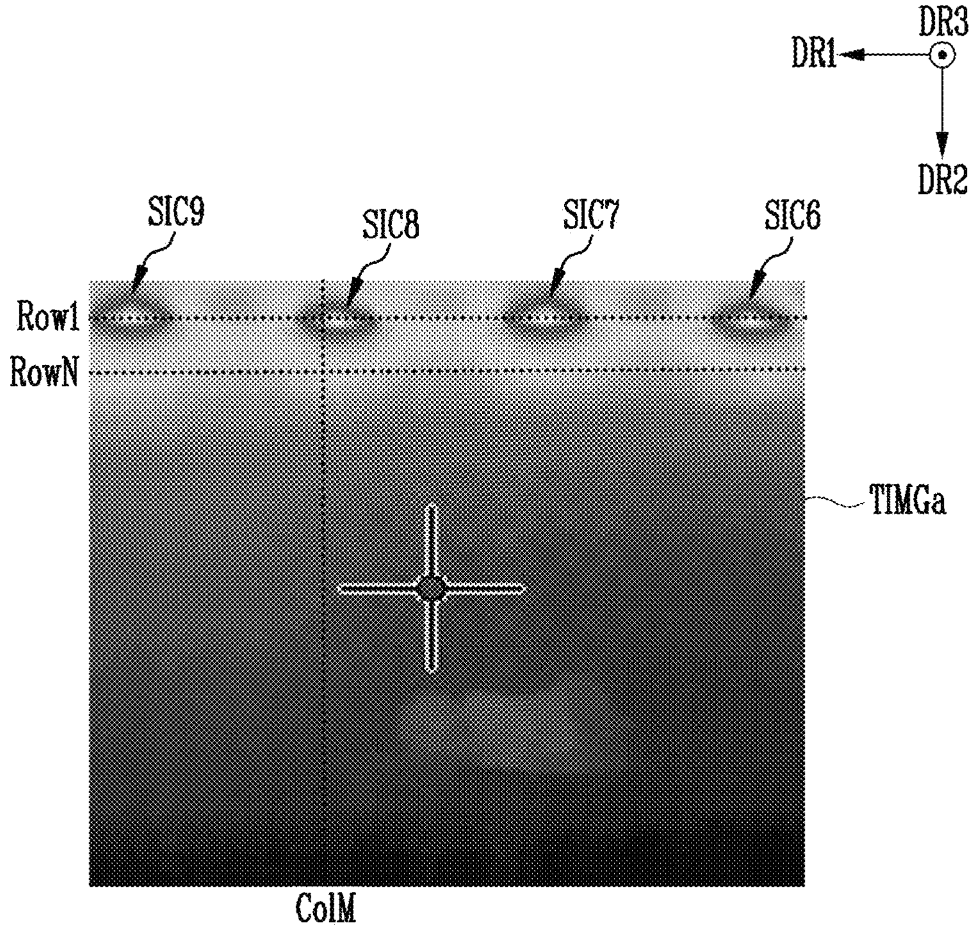
FIG. 4 is a diagram illustrating a thermographic image photographed by the camera.
Figure 5:
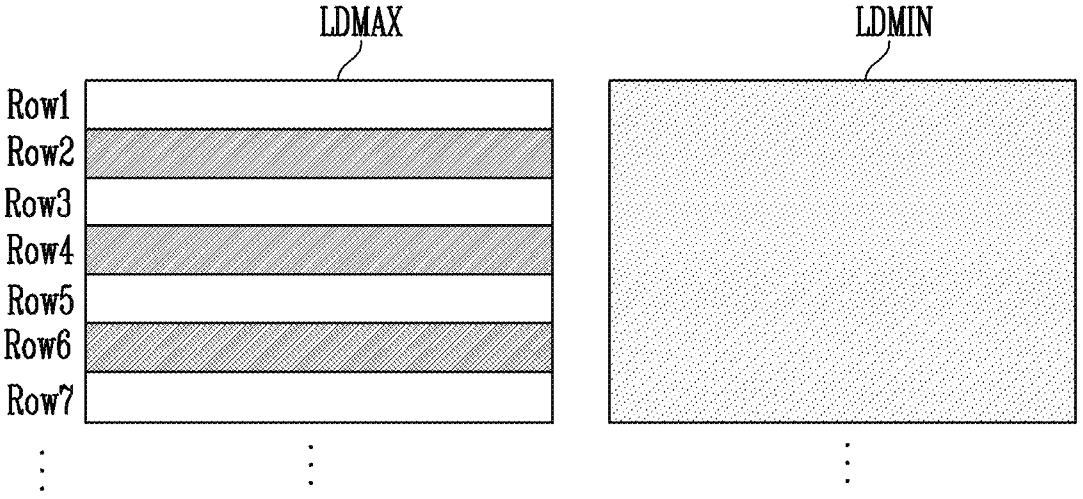
FIG. 5 is a diagram illustrating a case where a load of a driver becomes maximum/minimum.

FIG. 3 is a diagram illustrating a relationship of a camera, a computing device, and the display device in accordance with an embodiment of the present disclosure. FIG. 4 is a diagram illustrating a thermographic image photographed by the camera. FIG. 5 is a diagram illustrating a case where a load of a driver becomes maximum/minimum.

The display panel DP of the display device DD may display an image LDMAX in which a maximum load is applied to the drivers SIC1 to SIC9 (see FIG. 5). The image LDMAX may include a strip pattern. When a white gray scale and a black gray scale are alternatingly applied to odd-numbered pixel rows Row1, Row3, Row5, Row7 and even-numbered pixel rows Row2, Row4, Row6, the maximum load may be applied to the drivers SIC1 to SIC9. For example, when odd-numbered pixel rows Row1, Row3, Row5, Row7, . . . among pixel rows display a white grayscale, and even-numbered pixel rows Row2, Row4, Row6, . . . among the pixel rows display a black grayscale, the maximum load may be applied to the drivers SIC1 to SIC9 because the voltage swing of the drivers SIC1 to SIC9 becomes maximum. In this case, the temperature of the drivers SIC1 to SIC9 and the display panel DP may become a maximum temperature.

The camera CM may photograph a display surface of the display device DD, thereby generating a thermographic image TIMG. The camera CM may be an existing thermographic camera, an infrared camera, or the like. Referring to FIG. 4, a thermographic image TIMGa of a display area corresponding to the drivers SIC6, SIC7, SIC8, and SIC9 is illustrated.

The computing device CDEV may store first maximum temperature information Row1Max on a first pixel row Row1 and second maximum temperature information RowNMax on a second pixel row RowN in the thermographic image TIMGa in a memory of the display device DD. For example, the first pixel row Row1 may indicate pixels connected to a first scan line S1. The second pixel row RowN may indicate pixels connected to an Nth scan line. N may be an integer greater than 1. The computing device CDEV may be an existing general-purpose computer, a dedicated computer, or the like. N may be experimentally determined. For example, N may be determined such that a pixel row having relatively large temperature change is selected as the pixel row RowN.

Also, the computing device CDEV may store pixel column temperature information ColMMax on a pixel column ColM in the thermographic image TIMGa in the memory of the display device DD. For example, the pixel column ColM may indicate pixels connected to an Mth data line. M may be experimentally determined. For example, M may be determined such that a pixel column having relatively large temperature change is selected as the pixel column ColM.

In some embodiments, the computing device CDEV may further store first pixel column temperature information ColRMax and second pixel column temperature information ColSMax in the memory of the display device DD. This will be described in more detail with reference to FIGS. 14 to 19.

Next, the display panel DP of the display device DD may display an image LDMIN in which a minimum load is applied to the drivers SIC1 to SIC9 (see FIG. 5). When the pixel rows Row1, Row2, Row3, Row4, Row5, Row6, Row7, . . . display a single-color grayscale (e.g. a gray color), the minimum load may be applied to the drivers SIC1 to SIC9 while the voltage swing of the drivers SIC1 to SIC9 becomes minimum. The temperature of the drivers SIC1 to SIC9 and the display panel DP may become a minimum temperature.

The camera CM may photograph the display surface of the display device DD, thereby generating a thermographic image TIMG. The computing device CDEV may store first minimum temperature information Row1Min for the first pixel row Row1 and second minimum temperature information RowNMin for the second pixel row RowN in the thermographic image TIMGa in the memory of the display device DD.

FIGS. 6 to 13 are diagrams illustrating a controller in accordance with an embodiment of the present disclosure. In FIGS. 6 to 13, the controller TCON3 connected to the drivers SIC7 to SIC9 will be described.

A memory MEM may store first maximum temperature information Row1 Max for a first pixel row Row1, first minimum temperature information Row1Min for the first pixel row Row1, second maximum temperature information RowNMax for a second pixel row RowN, second minimum temperature information RowNMin for the second pixel row RowN, and pixel column temperature information ColMMax for a pixel column ColM.

Figure 6:
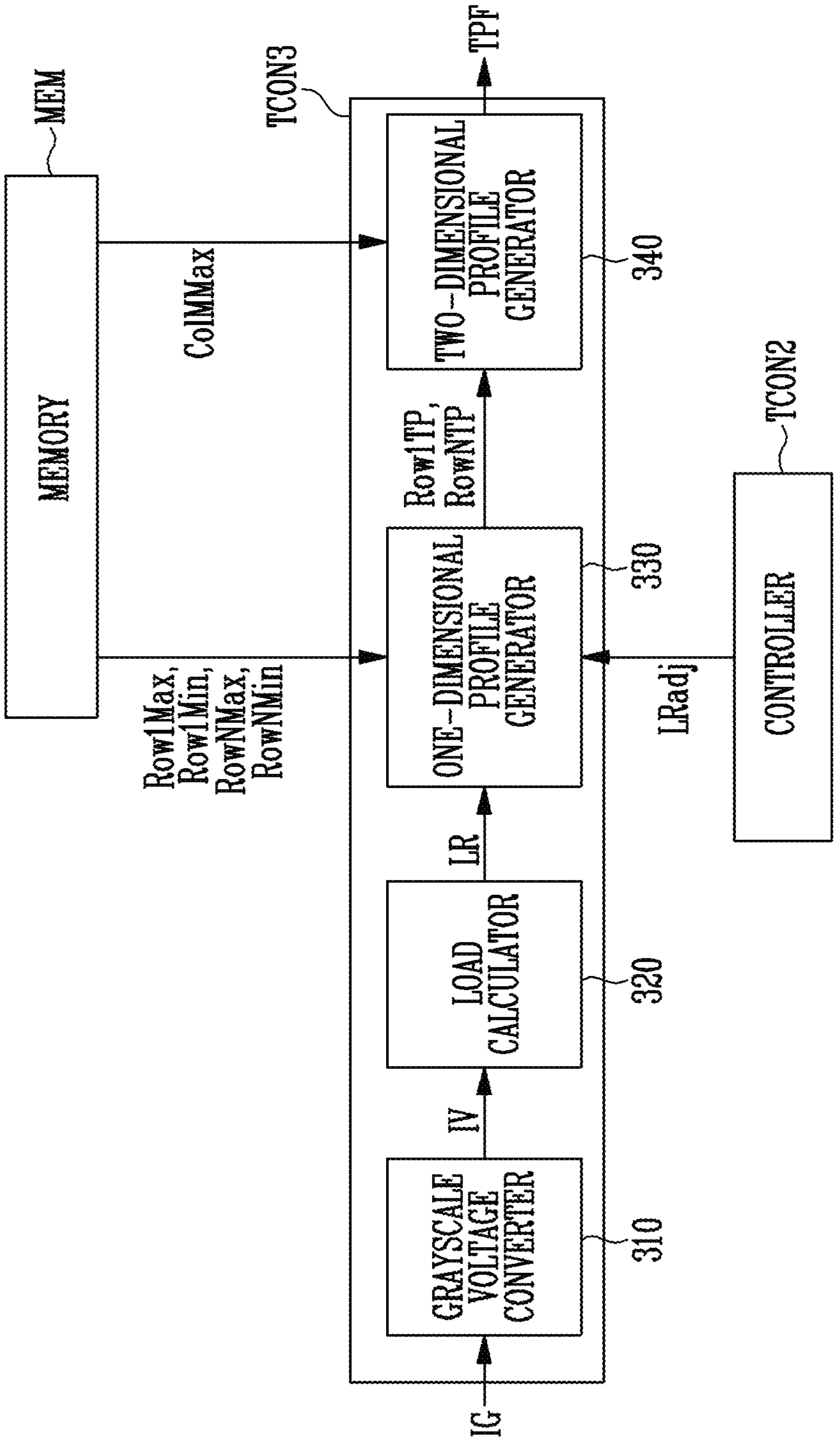
FIGS. 6 to 13 are diagrams illustrating a controller in accordance with an embodiment of the present disclosure.

Referring to FIG. 6, the controller TCON3 may include a grayscale voltage converter 310, a load calculator 320, a one-dimensional profile generator 330, and a two-dimensional profile generator 340.

Figure 7:
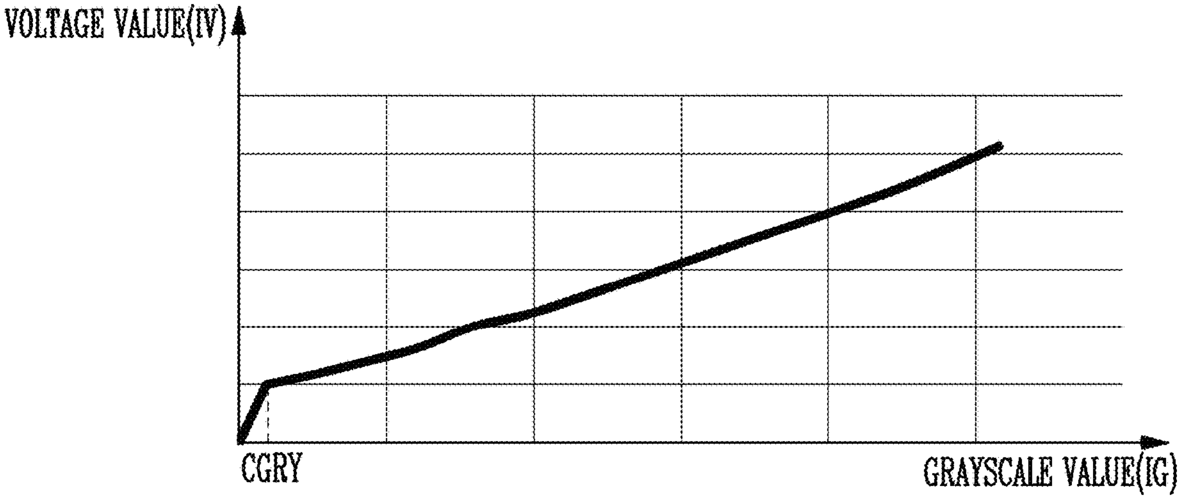

The grayscale voltage converter 310 may convert grayscale values IG included in image data into voltage values IV. Since the voltage values IV linearly correspond to a temperature increment, it may be more advantageous to use the voltage values IV when a temperature profile is generated. Referring to FIG. 7, a graph in which the grayscale values IG are converted into the voltage values IV is exemplarily illustrated. The graph may increase to have a first slop up to a reference grayscale value CGRY, and increase to have a second slope after the reference grayscale value CGRY. The second slope may be smaller than the first slope. The reference grayscale value CGRY may be experimentally determined, and be determined as a low grayscale value.

The load calculator 320 may calculate a load ratio of the driver SIC7 using voltage values IV corresponding to the driver SIC7. Also, the load calculator 320 may calculate a load ratio of the driver SIC8 using voltage values IV corresponding to the driver SIC8. The load calculator 320 may calculate a load ratio of the driver SIC9 using voltage values IV corresponding to the driver SIC9.

When a load ratio is calculated, it is assumed that a number of pixel rows (i.e., the number of scan lines) is p and a number of channels of each driver is x. The number of channels may be equal to a number of data lines connected to the driver.

$$\text{Load\_Sum}(Ch.M) = \sum_{N=1}^{p-1} |V(N) - V(N+1)| \quad \text{Equation 1}$$

In Equation 1, V(N) denotes a voltage value corresponding to a pixel located on an Nth pixel row of an Mth channel, and V(N+1) denotes a voltage value corresponding to a pixel located on an (N+1)th pixel row of the Mth channel. Load_Sum (Ch.M) denotes a load sum of the Mth channel. Referring to Equation 1, it can be seen that a load increases as a difference between V(N) and V(N+1) becomes larger.

$$\text{Load\_Total} = \sum_{M=1}^{x} \text{Load\_Sum}(Ch.M) \quad \text{Equation 2}$$

In Equation 2, a total load Load_Total of a corresponding driver may be calculated by adding up all load sums Load_Sum (Ch.M) corresponding to a first channel to a last channel (xth channel).

$$\text{Load\_Ratio} = \frac{\text{Load\_Total}}{\text{Load\_MAX}} \times 100 \quad \text{Equation 3}$$

In Equation 3, a load ratio Load_Ratio of a driver may be calculated by calculating a percentage of a total load Load_Total with respect to a maximum load Load_MAX of the driver. The maximum load Load MAX of the driver is a maximum value of the load the corresponding driver can output.

The one-dimensional profile generator 330 may receive a load ratio LRadj of the driver SIC6 disposed adjacent to the controller TCON3 from the controller TCON2. The one-dimensional profile generator 330 may generate first predicted temperature information Row1TP of the first pixel row Row1 using the first maximum temperature information Row1Max, the first minimum temperature information Row1Min, load ratios of the drivers SIC6, SIC7, SIC8, and SIC9.

Figure 8:
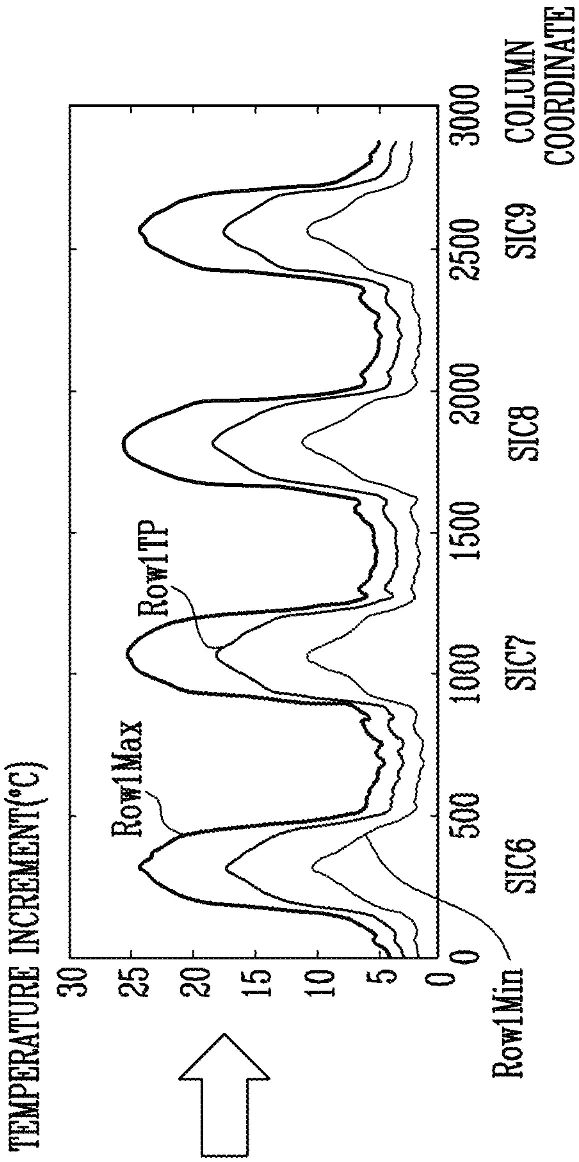
Figure 9:
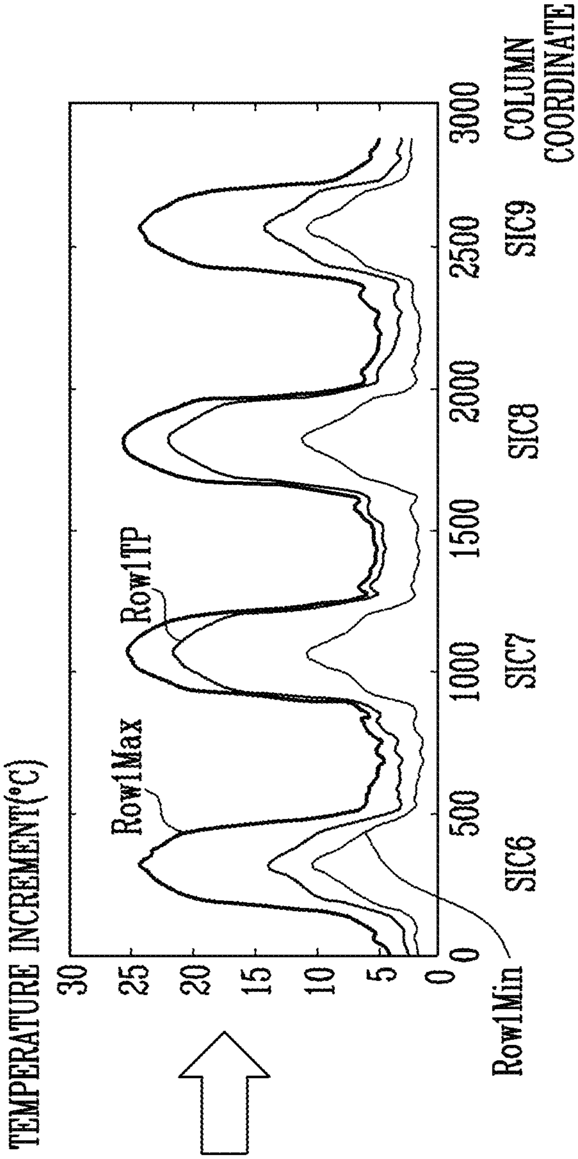

Referring to FIG. 8, a case where each of load ratios of the drivers SIC6, SIC7, SIC8, and SIC9 is 50% is exemplarily illustrated. Referring to FIG. 9, a case where each of load ratios of the drivers SIC6 and SIC9 is 25% and each of load ratios of the drivers SIC7 and SIC8 is 75% is exemplarily illustrated.

The one-dimensional profile generator 330 may generate the first predicted temperature information Row1TP which is closer to a temperature increment value of the first minimum temperature information Row1Min as the load ratio becomes lower and which is to come closer to a temperature increment value of the first maximum temperature information Row1Max as the load ratio becomes higher.

Also, the one-dimensional profile generator 330 may generate second predicted temperature information RowNTP of the second pixel row RowN using the second maximum temperature information RowNMax, the second minimum temperature information RowNMin, and load ratios of the drivers SIC6, SIC7, SIC8, and SIC9.

Figure 10:
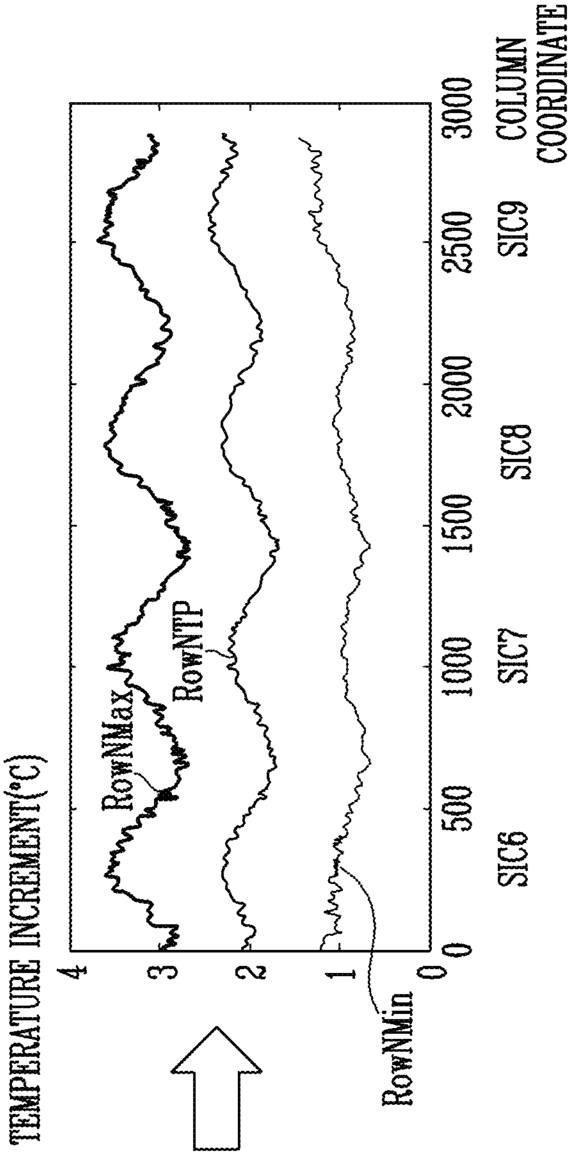
Figure 11:
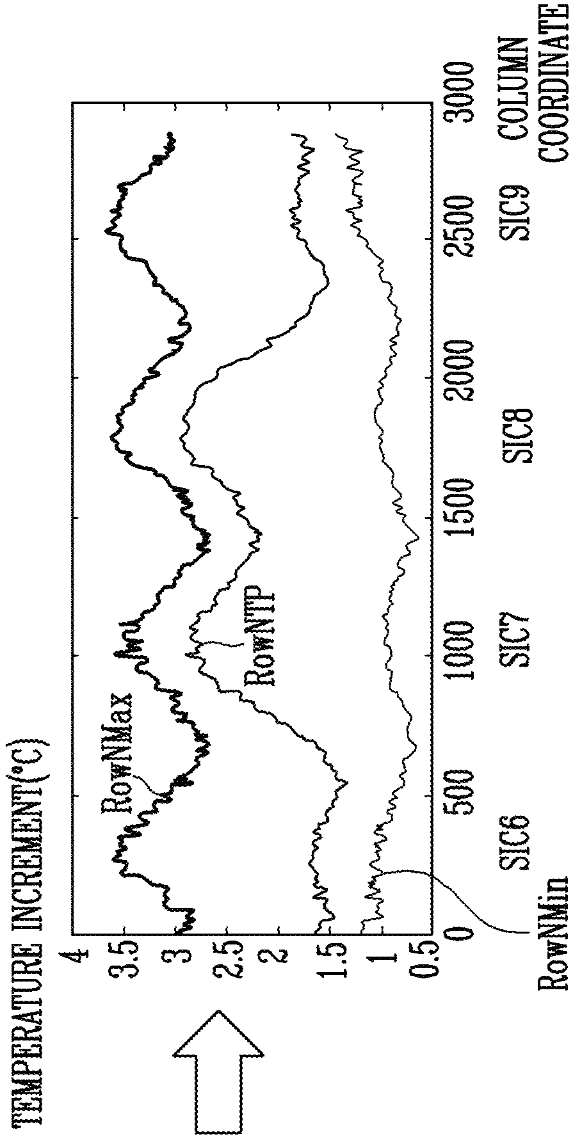

Referring to FIG. 10, a case where each of load ratios of the drivers SIC6, SIC7, SIC8, and SIC9 is 50% is exemplarily illustrated. Referring to FIG. 11, a case where each of load ratios of the drivers SIC6 and SIC9 is 25% and each of load ratios of the drivers SIC7 and SIC8 is 75% is exemplarily illustrated.

The one-dimensional profile generator 330 may generate the second predicted temperature information RowNTP which is closer to a temperature increment value of the second minimum temperature information RowNMin as the load ratio becomes lower and which is closer to a temperature increment value of the second maximum temperature information RowNMax as the load ratio become higher.

Figure 12:
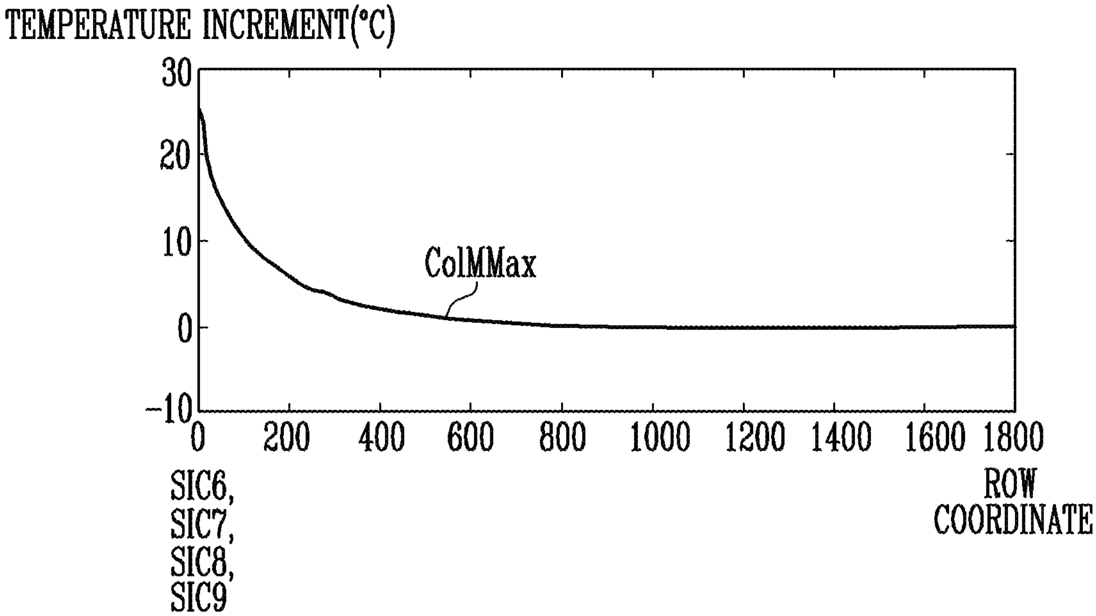
Figure 13:
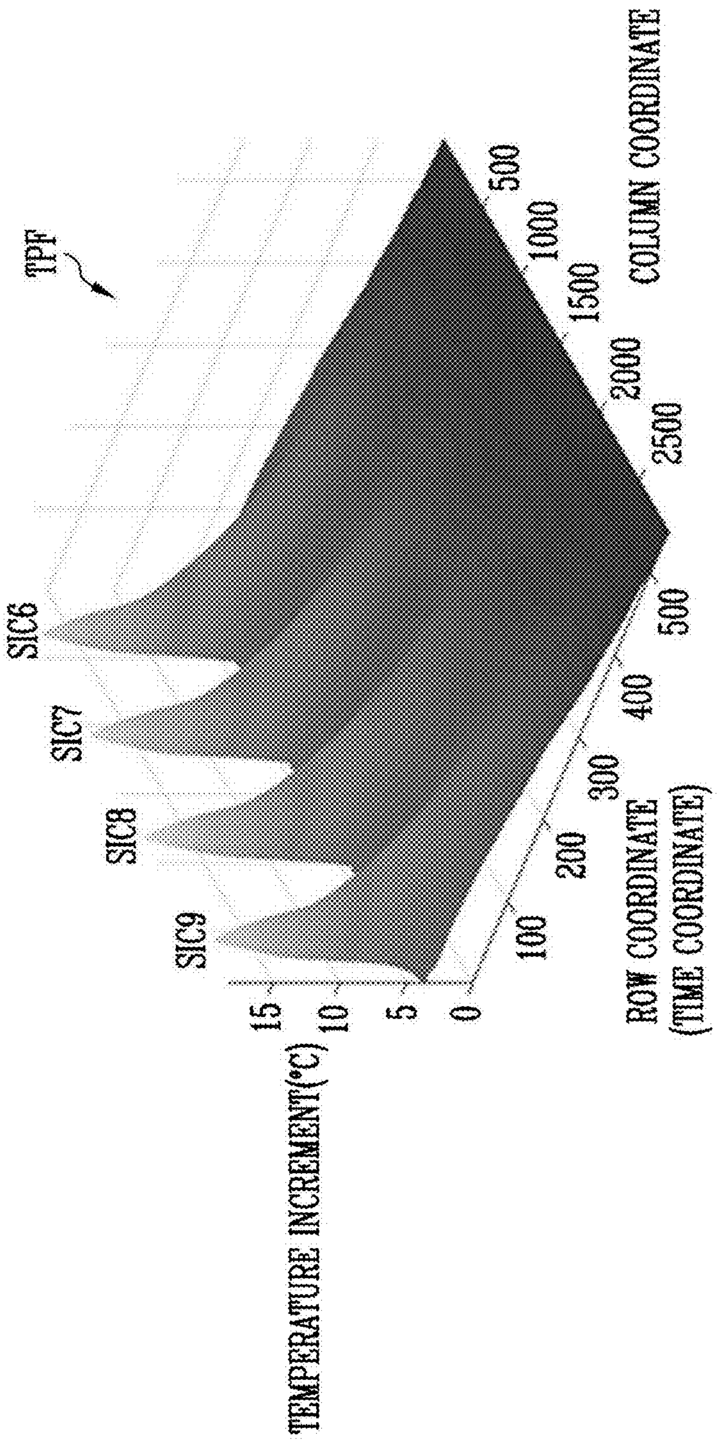

The two-dimensional profile generator 340 may generate a temperature profile TPF by linearly interpolating the first predicted temperature information Row1TP and the second predicted temperature information RowNTP using the pixel column temperature information ColMMax (see FIGS. 12 and 13). Row coordinate in FIG. 13 may indicate positions of pixel rows. Also, the row coordinate in FIG. 13 may be a time coordinate indicating an order of a data voltage input to the pixel rows.

In accordance with the embodiment of the present disclosure, a real-time temperature profile TPF for real-time image data can be generated using a minimum memory capacity.

FIGS. 14 to 19 are diagrams illustrating a controller in accordance with another embodiment of the present disclosure.

Figure 14:
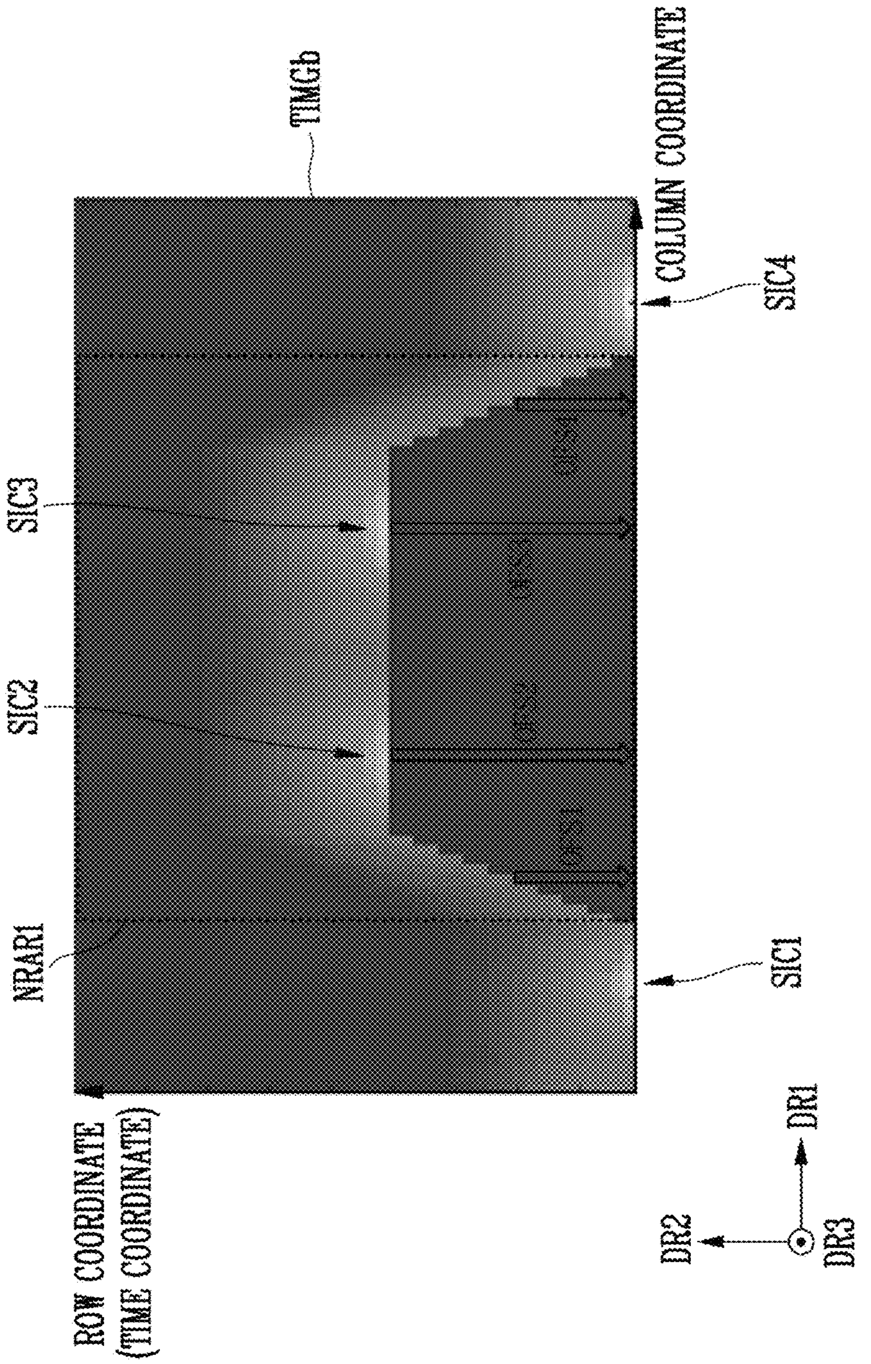
FIGS. 14 to 19 are diagrams illustrating a controller in accordance with another embodiment of the present disclosure.

Referring to FIG. 14, a thermographic image TIMGb of a display area corresponding to the drivers SIC1, SIC2, SIC3, and SIC4 is illustrated. An area corresponding to the notch portion NCH shown in FIG. 1 may have minimum temperature increment values.

Figure 15:
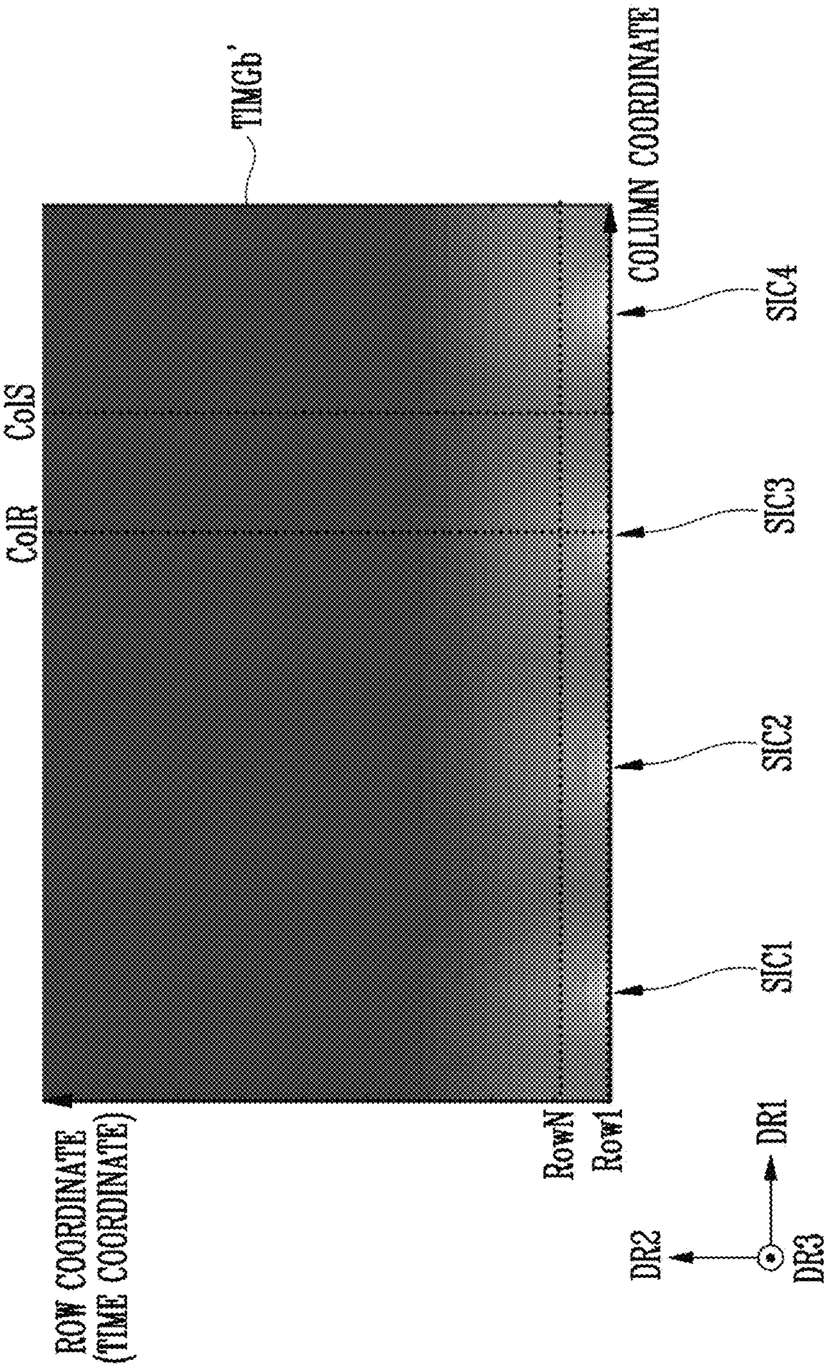

The computing device CDEV may generate a thermographic image TIMGb' by modifying a time coordinate of temperature information NRAR1 having a column coordinate of the notch portion NCH in the thermographic image TIMGb (see FIG. 15). For example, the computing device CDEV may generate the thermographic image TIMGb' by subtracting offsets OFS1, OFS2, OFS3, OFS4, . . . from the time coordinate of the temperature information NRAR1 having the column coordinate of the notch portion NCH in the thermographic image TIMGb. The offsets OFS1, OFS2, OFS3, OFS4, . . . may be delay of time the drivers SIC1, SIC2, SIC3, and SIC4 output data voltages to data lines in the thermographic image TIMGb'. The computing device CDEV may give minimum values among temperature increment values to a portion at which no temperature information exist in the thermographic image TIMGb'.

The thermographic image TIMGb' may not include a sharp change, similarly to the thermographic image TIMGa. The computing device CDEV may generate first maximum temperature information Row1Max of a first pixel row Row1, first minimum temperature information Row1Min of the first pixel row Row1, second maximum temperature information RowNMax of a second pixel row RowN, and second minimum temperature information RowNMin of the second pixel row RowN based on a thermographic image TIMGb' in the case of a maximum temperature and a thermographic image TiMGb' in the case of a minimum temperature (see the descriptions of FIGS. 3 to 5).

Also, the computing device CDEV may store first pixel column temperature information ColRMax of a first pixel column ColR and second pixel column temperature information ColSMax of a second pixel column ColS in the thermographic image TIMGb' in the memory MEM of the display device DD. For example, the first pixel column ColR may indicate pixels connected to an Rth data line. R may be experimentally determined. For example, R may be determined such that a pixel column having a relatively large temperature change is selected as the first pixel column ColR. For example, the first pixel column ColR may extend in the second direction DR2 from the driver SIC3. The second pixel column ColS may indicate pixels connected to an Sth data line. S may be experimentally determined. For example, S may be determined such that a pixel column located at a boundary between the driver SIC3 and the driver SIC4 is selected. For example, the second pixel column ColS may extend in the second direction DR2 between the driver SIC3 and the driver SIC4. The second pixel column temperature information ColSMax may increase the accuracy of modeling which may decrease due to the shape of the notch portion NCH.

Figure 16:
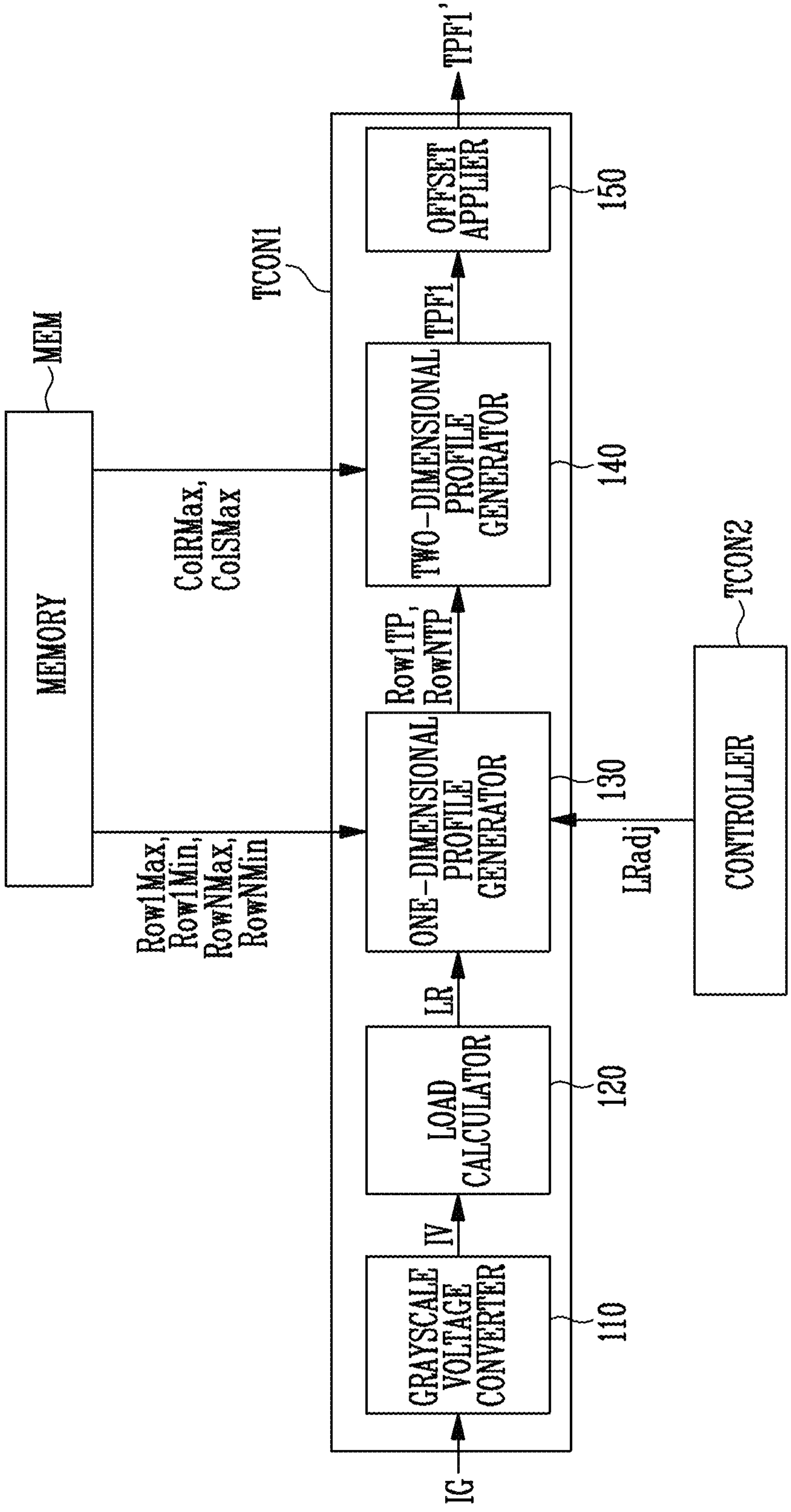

Referring to FIG. 16, the controller TCON1 may include a grayscale voltage converter 110, a load calculator 120, a one-dimensional profile generator 130, a two-dimensional profile generator 140, and an offset applier 150. In FIG. 16, descriptions of portions overlapping with those shown in FIG. 6 will be omitted.

The two-dimensional profile generator 140 may generate a first temperature profile TPF1 by linearly interpolating the first predicted temperature information Row1TP and the second predicted temperature information RowNTP using the first pixel column temperature information ColRMax and the second pixel column temperature information ColSMax.

Figure 17:
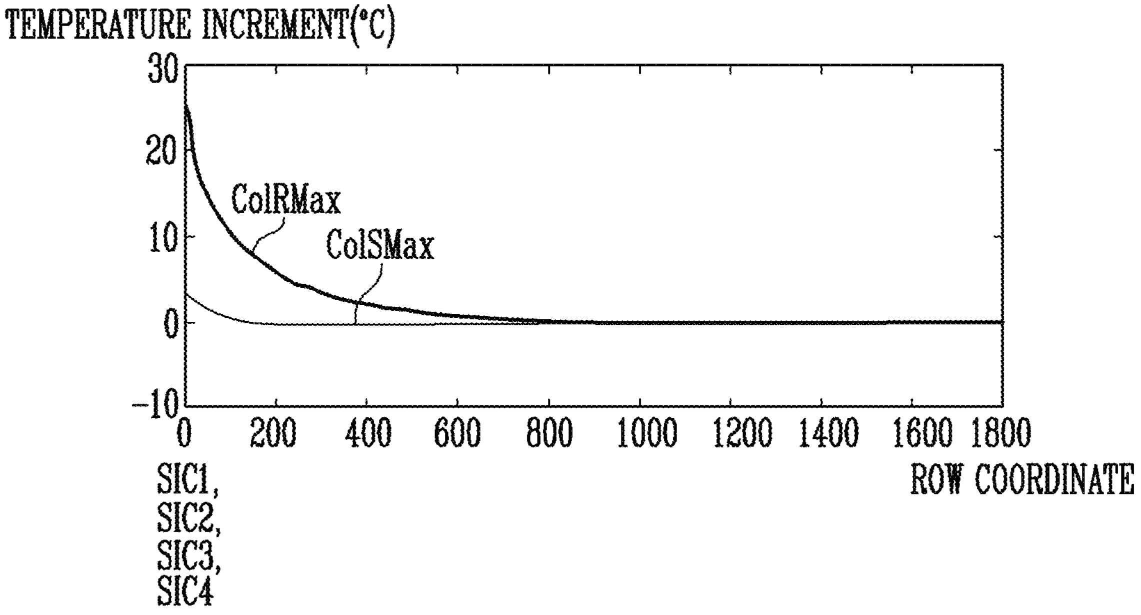

Referring to FIG. 17, a slope with respect to a row coordinate of the second pixel column temperature information ColSMax may be smaller than a slope with respect to a row coordinate of the first pixel column temperature information ColRMax. In this embodiment, two pixel column temperature information ColRMax and ColSMax may be used to generate a more accurate first temperature profile TPF1. In another embodiment, in order to reduce calculation cost, the two-dimensional profile generator 140 may generate the first temperature profile TPF1 by linearly interpolating the first predicted temperature information Row1TP and the second predicted temperature information RowNTP using only the first pixel column temperature information ColRMax.

Figure 18:
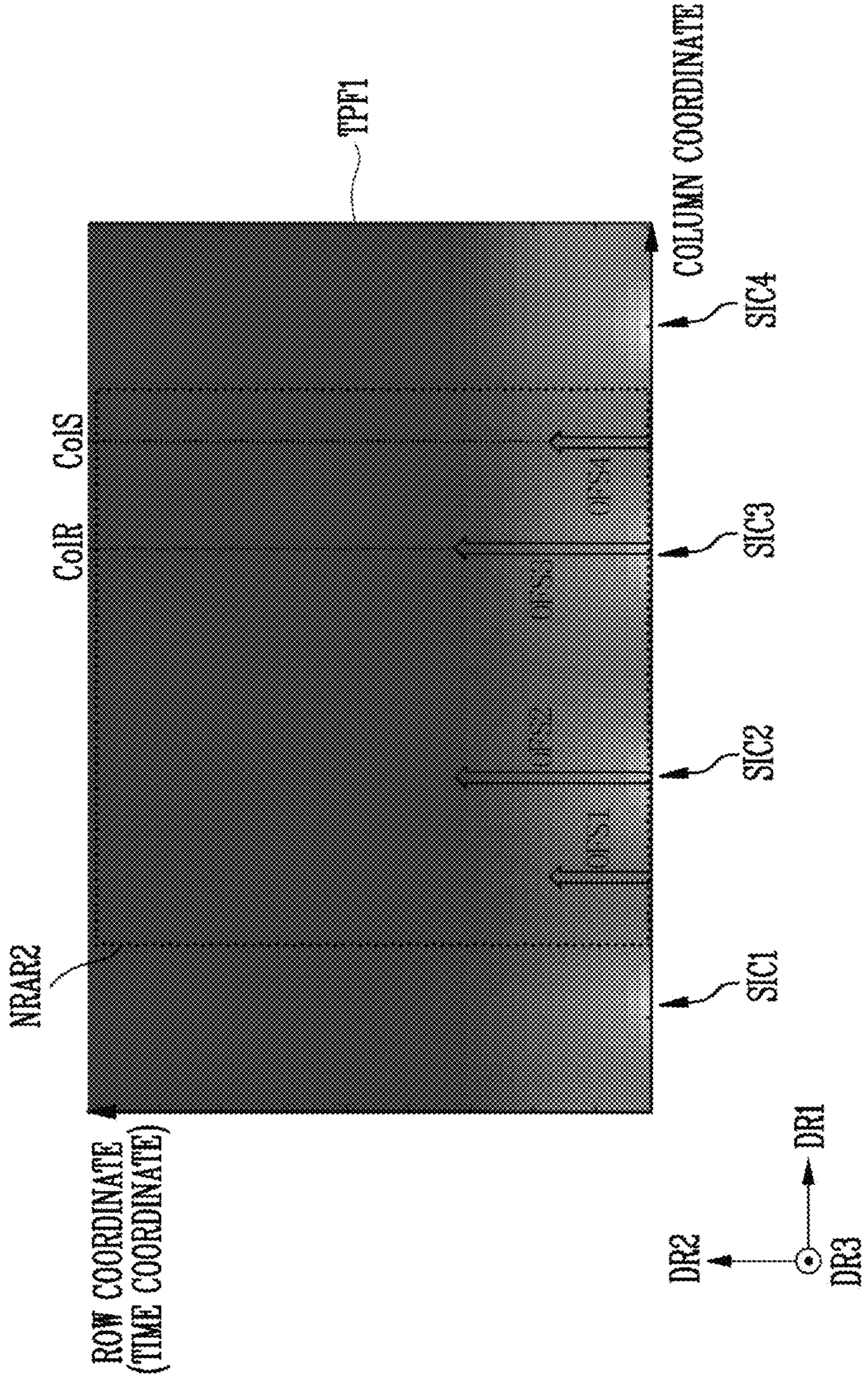
Figure 19:
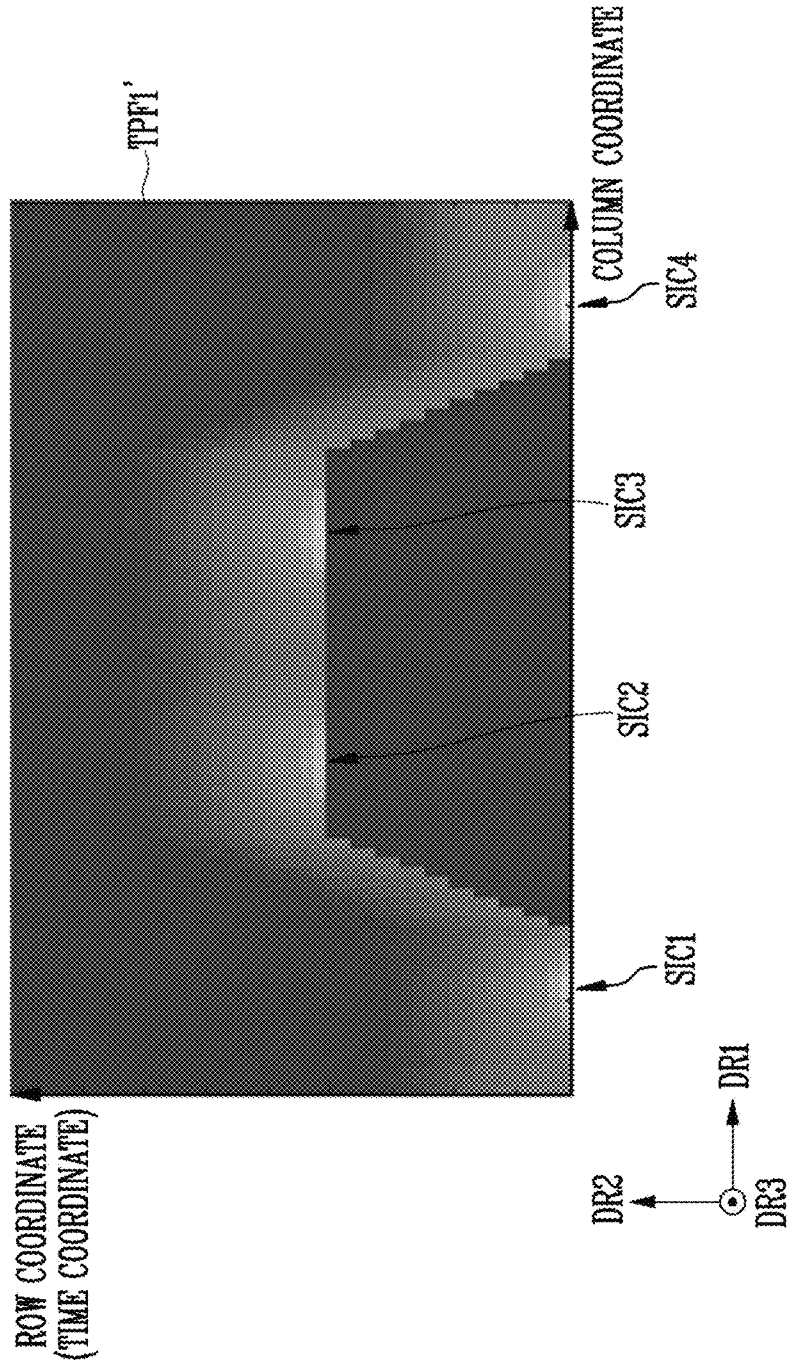

Referring to FIGS. 18 and 19, the offset applier 150 may generate a second temperature profile TPF1' by modifying a time coordinate of temperature information NRAR2 having a column coordinate of the notch portion NCH in the first temperature profile TPF1. For example, the offset applier 150 may generate the second temperature profile TPF1' by adding offsets OFS1, OFS2, OFS3, OFS4, . . . to the time coordinate of the temperature information NRAR2 having the column coordinate of the notch portion NCH in the first temperature profile TPF1. The offset applier 150 may give minimum values among temperature increment values to a portion at which no temperature information exist in the second temperature profile TPF1'.

For example, the offset applier 150 may generate the second temperature profile TPF1' by adding an offset OFS3 to a time coordinate of temperature information corresponding to the first pixel column ColR among temperature information included in the first temperature profile TPF1. Also, the offset applier 150 may generate the second temperature profile TPF1' by adding an offset OFS4 to a time coordinate of temperature information corresponding to the second pixel column ColS. The offset OFS4 may be smaller than the offset OFS3.

The controller TCON1 may control the drivers SIC1, SIC2, and SIC3 connected to the display panel DP shown in FIG. 1 using the second temperature profile TPF1'. While scan signals are applied to the first scan line S1 to the (y−1)th scan line, the driver SIC1 may apply data voltages corresponding to active image data to the data lines, and heat may be generated in the driver SIC1. Meanwhile, while scan signals are applied to the first scan line S1 to the (y−1)th scan line, image data received by the drivers SIC2 and SIC3 may correspond to black data. Therefore, the drivers SIC2 and SIC3 do not apply any separate data voltages to the data lines (or maintain a specific data voltage), and no heat may be generated in the drivers SIC2 and SIC3. From a time at which a scan signal is applied to the yth scan line, the drivers SIC2 and SIC3 may apply data voltages corresponding to active image data to the data lines, and heat may be generated in the drivers SIC2 and SIC3.

In an embodiment, the controller TCON3 shown in FIG. 6 may be configured identically to the controller TCON1 shown in FIG. 16. The first temperature profile TPF1 and the second temperature profile TPF1' of the controller TCON3 may be equal to each other. That is, the offsets may be set to 0.

Figure 20:
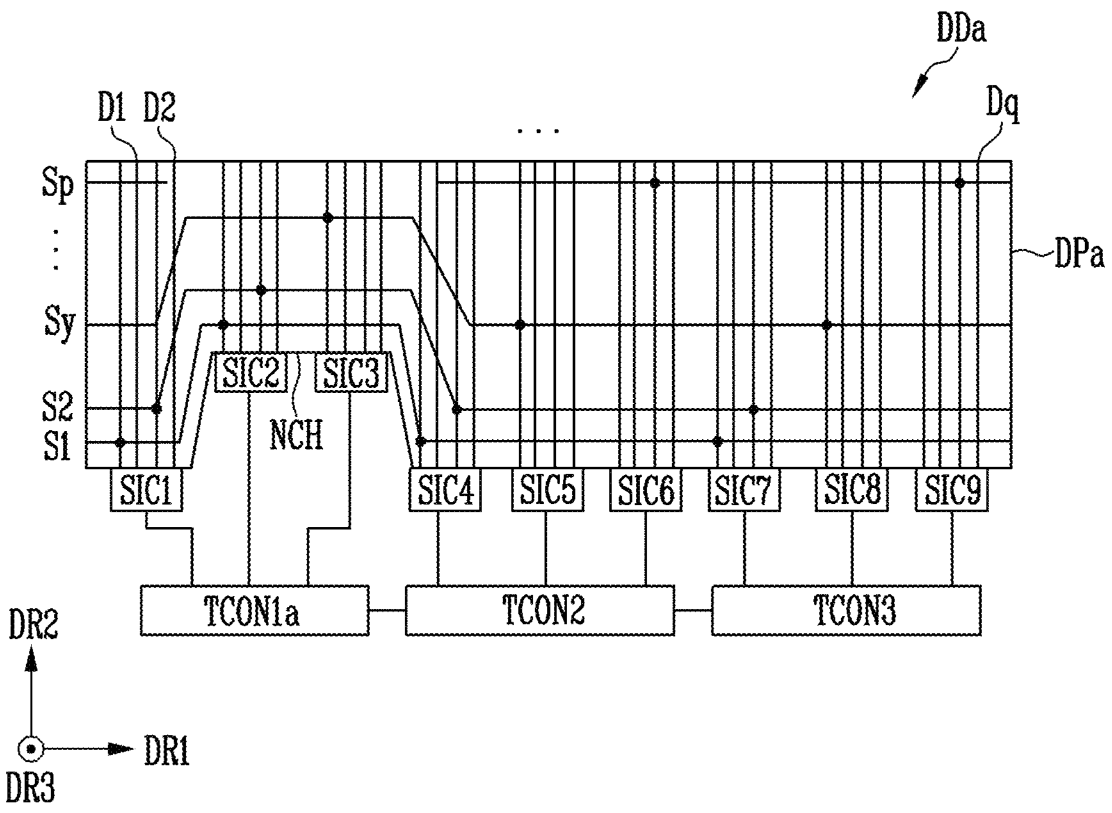
FIG. 20 is a diagram illustrating a display device in accordance with another embodiment of the present disclosure.

FIG. 20 is a diagram illustrating a display device in accordance with another embodiment of the present disclosure. Overlapping descriptions of common portions between the display device DDa shown in FIG. 20 and the display device DD shown in FIG. 1 will be omitted.

In a display panel DPa of the display device DDa shown in FIG. 20, an arrangement of scan lines S1, S2, . . . , Sy, . . . , and Sp may be different from an arrangement of scan lines S1, S2, . . . , Sy, . . . , and Sp in the display panel DP of the display device DD shown in FIG. 1. For example, a first scan line S1 is connected to pixels connected to all of the drivers SIC1, SIC2, SIC3, SIC4, SIC5, SIC6, SIC7, SIC8, and SIC9.

In the case of FIG. 1, the first scan line S1 to the (y−1)th scan line have shapes which extend in the first direction and then disconnected at the notch portion NCH. On the other hand, in the case of FIG. 20, at least some scan lines including the first scan line S1 may extend in the first direction DR1 to be bent along edge of the notch portion NCH.

In the case of FIG. 1 and the case of FIG. 20, numbers of scan lines connected to pixels connected to the respective drivers SIC1, SIC4, SIC5, SIC6, SIC7, SIC8, and SIC9 may be the same. For example, in the case of FIG. 20, a display area located in the second direction DR2 from the drivers SIC1 and SIC4 to SIC9 may include p scan lines S1 to Sp. A display area located in the second direction DR2 from the drivers SIC2 and SIC3 may include (p−y+1) scan lines S1, S2, . . . .

Figure 21:
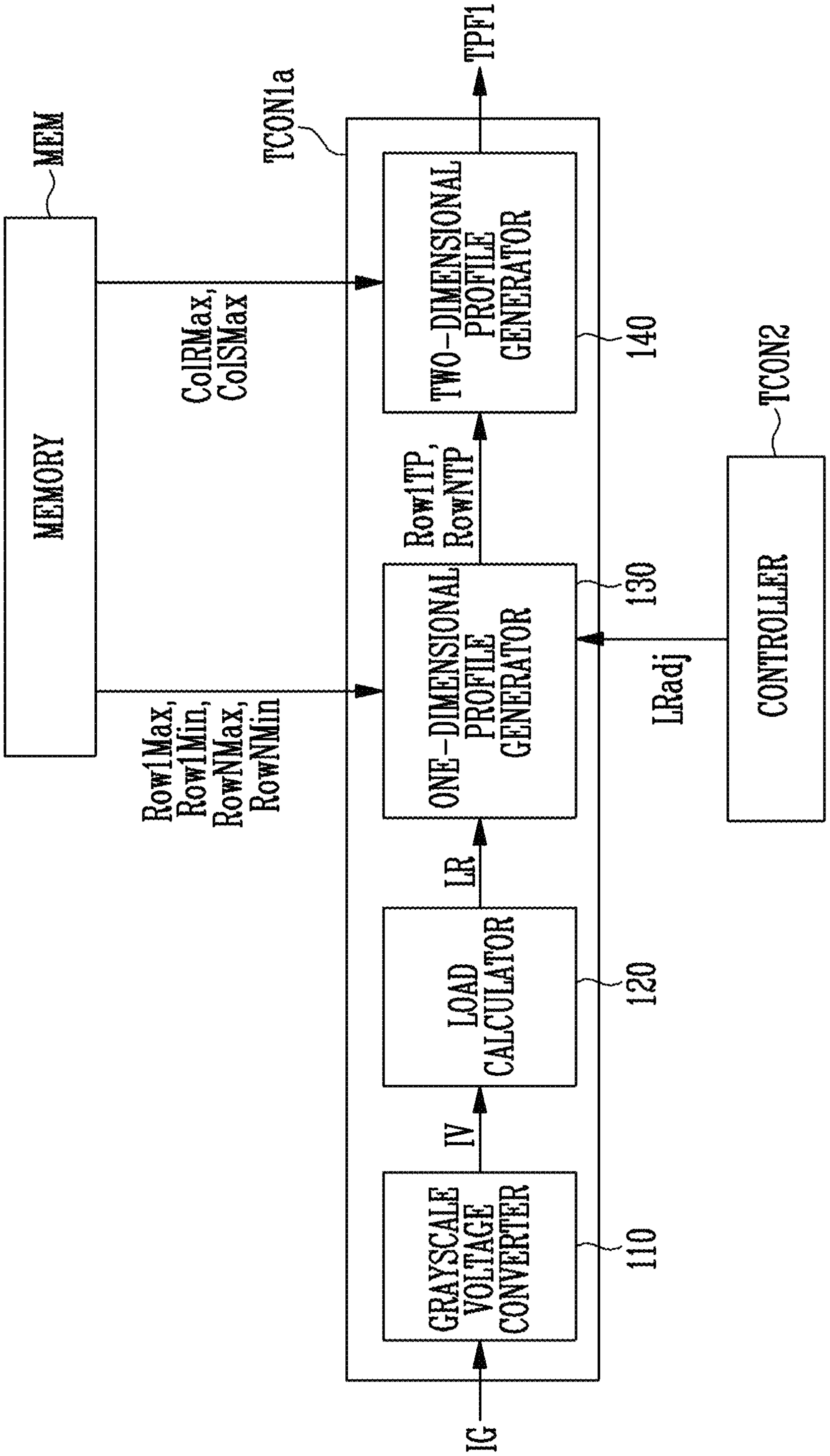
FIGS. 21 and 22 are diagrams illustrating a controller in accordance with still another embodiment of the present disclosure.
Figure 22:
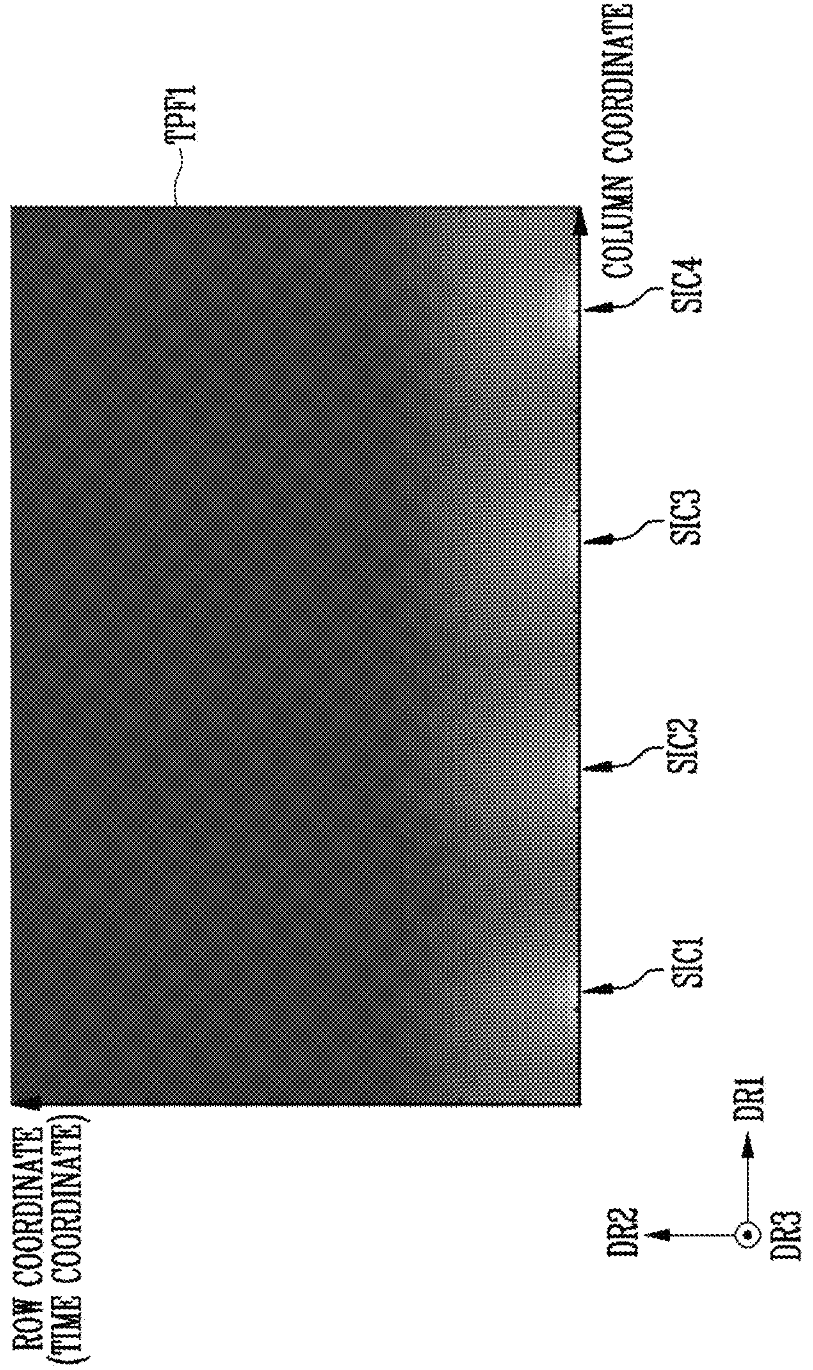

FIGS. 21 and 22 are diagrams illustrating a controller in accordance with still another embodiment of the present disclosure.

Unlike the controller TCON1 shown in FIG. 16, the controller TCONla shown in FIG. 20 does not include the offset applier 150. The controller TCONla may use a first temperature profile TPF1 as a final temperature profile.

Referring to FIG. 22, it can be seen that, in the first temperature profile TPF1, time coordinates of the drivers SIC1, SIC2, and SIC3 connected to the controller TCONla are the same. Referring to the structure of the scan lines S1 to Sp shown in FIG. 20, since the drivers SIC1, SIC2, and SIC3 supply data voltages to data lines from a time at which a scan signal is applied to the first scan line S1, heat generation start times of the drivers SIC1, SIC2, and SIC3 may be the same. That is, the drivers SIC2 and SIC3 may receive active image data instead of black data at the time at which the scan signal is applied to the first scan line S1.

In the display device in accordance with the present disclosure, a temperature profile can be generated with respect to display panels having various shapes.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:

a display panel including pixels;

a first driver configured to supply data voltages to A pixels based on received first image data, where A is an integer greater than 1;

a second driver configured to supply data voltages to B pixels based on received second image data, where B is an integer greater than 0 and smaller than the A;

a third driver disposed adjacent to the second driver in a first direction, the third driver supplying data voltages to corresponding pixels based on received third image data;

a first controller configured to calculate a first load ratio of the first driver based on the first image data, and calculate a second load ratio of the second driver based on the second image data; and a second controller configured to calculate a third load ratio of the third driver based on the third image data, wherein the first controller receives the third load ratio from the second controller and generates a first temperature profile for the first driver and the second driver using the first load ratio, the second load ratio, and the third load ratio.

2. The display device of claim 1, wherein the display panel further includes a notch portion, and wherein the pixels connected to the second driver are located in a second direction different from the first direction from the notch.

3. The display device of claim 2, wherein data lines connected to the second driver extend in the second direction.

4. The display device of claim 1, wherein the pixels connected to the first driver are connected to P scan lines, where P is an integer greater than 1, and wherein the pixels connected to the second driver are connected to scan lines of which number is smaller than the P.

5. The display device of claim 4, wherein a y-th scan line connected to pixels connected to the first driver is a first scan line connected to pixels connected to the second driver, where y is an integer greater than 1.

6. The display device of claim 5, wherein the first controller includes a grayscale voltage converter configured to convert first grayscale values included in the first image data into first voltage values, and convert second grayscale values included in the second image data into second voltage values.

7. The display device of claim 6, wherein the first controller further includes a load calculator configured to calculate the first load ratio using the first voltage values, and calculate the second load ratio using the second voltage values.

8. The display device of claim 7, further comprising a memory storing first maximum temperature information of a first pixel row and first minimum temperature information of the first pixel row, wherein the first controller further includes a one-dimensional profile generator configured to generate first predicted temperature information of the first pixel row using the first maximum temperature information, the first minimum temperature information, the first load ratio, the second load ratio, and the third load ratio.

9. The display device of claim 8, wherein the memory further stores second maximum temperature information of a second pixel row and second minimum temperature information of the second pixel row, and wherein the one-dimensional profile generator generates second predicted temperature information of the second pixel row using the second maximum temperature information, the second minimum temperature information, the first load ratio, the second load ratio, and the third load ratio.

10. The display device of claim 9, wherein the memory further includes first pixel column temperature information of a first pixel column, and wherein the first controller further includes a two-dimensional profile generator configured to generate a temperature profile by linearly interpolating the first predicted temperature information and the second predicted temperature information using the first pixel column temperature information.

11. The display device of claim 9, wherein the memory further includes first pixel column temperature information of a first pixel column and second pixel column temperature information of a second pixel column, wherein the first pixel column extends in a second direction different from the first direction from the second driver, and wherein the second pixel column extends in the second direction between the second driver and the third driver.

12. The display device of claim 11, wherein the first controller further includes a two-dimensional profile generator configured to generate a first temperature profile by linearly interpolating the first predicted temperature information and the second predicted temperature information using the first pixel column temperature information and the second pixel column temperature information.

13. The display device of claim 12, wherein the first controller further includes an offset applier configured to generate a second temperature profile by adding a first offset to a time coordinate of temperature information corresponding to the first pixel column among temperature information included in the first temperature profile.

14. The display device of claim 13, wherein the offset applier generates the second temperature profile by adding a second offset to a time coordinate of temperature information corresponding to the second pixel column, and wherein the second offset is smaller than the first offset.

15. The display device of claim 4, wherein a first scan line is connected to pixels connected to the first driver and pixels connected to the second driver.

16. The display device of claim 15, wherein the first controller includes a grayscale voltage converter configured to convert first grayscale values included in the first image data into first voltage values, and convert second grayscale values included in the second image data into second voltage values.

17. The display device of claim 16, wherein the first controller further includes a load calculator configured to calculate the first load ratio using the first voltage values, and calculate the second load ratio using the second voltage values.

18. The display device of claim 17, further comprising a memory storing first maximum temperature information of a first pixel row, first minimum temperature information of the first pixel row, second maximum temperature information of a second pixel row, and second minimum temperature information of the second pixel row, wherein the first controller further includes a one-dimensional profile generator configured to generate first predicted temperature information of the first pixel row using the first maximum temperature information, the first minimum temperature information, the first load ratio, the second load ratio, and the third load ratio, and generate second predicted temperature information of the second pixel row using the second maximum temperature information, the second minimum temperature information, the first load ratio, the second load ratio, and the third load ratio.

19. The display device of claim 18, wherein the memory further stores first pixel column temperature information of a first pixel column and second pixel column temperature information of a second pixel column, wherein the first pixel column extends in a second direction different from the first direction from the second driver, and wherein the second pixel column extends in the second direction between the second driver and the third driver.

20. The display device of claim 19, wherein the first controller further includes a two-dimensional profile generator configured to generate a first temperature profile by linearly interpolating the first predicted temperature information and the second predicted temperature information using the first pixel column temperature information and the second pixel column temperature information.

* * * * *